(12) United States Patent
Xue et al.

(10) Patent No.: US 6,801,410 B2
(45) Date of Patent: Oct. 5, 2004

(54) SIDE FLUX GUIDE FOR CURRENT PERPENDICULAR TO PLANE MAGNETORESISTIVE TRANSDUCER

(75) Inventors: Song Sheng Xue, Eden Prairie, MN (US); Paul E. Anderson, Eden Prairie, MN (US); Patrick Joseph Ryan, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 217 days.

(21) Appl. No.: 10/247,124

(22) Filed: Sep. 19, 2002

(65) Prior Publication Data

US 2003/0223157 A1 Dec. 4, 2003

Related U.S. Application Data

(60) Provisional application No. 60/385,661, filed on Jun. 3, 2002.

(51) Int. Cl.[7] .............................................. G11B 5/39
(52) U.S. Cl. .................................... 360/321; 360/324.2
(58) Field of Search ....................... 360/324.1, 324.11, 360/324.12, 324.2, 321

(56) References Cited

U.S. PATENT DOCUMENTS

| | | | | |
|---|---|---|---|---|
| 5,901,018 | A | * 5/1999 | Fontana al. ............... | 360/324.2 |
| 6,344,954 | B1 | 2/2002 | Redon et al. ............. | 360/324.2 |
| 6,381,107 | B1 | 4/2002 | Redon et al. ............. | 360/324.2 |
| 6,504,689 | B1 | * 1/2003 | Gill et al. ................. | 360/324.2 |
| 6,631,055 | B2 | * 10/2003 | Childress et al. ........... | 360/321 |
| 6,671,141 | B2 | * 12/2003 | Shimazawa et al. ...... | 360/324.2 |
| 6,710,984 | B1 | * 3/2004 | Yuasa et al. ............ | 360/324.11 |
| 6,717,780 | B2 | * 4/2004 | Hiramoto et al. ......... | 360/324.2 |
| 2001/0004306 | A1 | 6/2001 | Lee et al. .................... | 360/244 |
| 2001/0014001 | A1 | 8/2001 | Aoshima et al. ........ | 360/327.32 |
| 2001/0021089 | A1 | 9/2001 | Miyauchi et al. ......... | 360/324.2 |
| 2001/0024347 | A1 | 9/2001 | Shimazawa et al. ...... | 360/324.2 |
| 2002/0001158 | A1 | 1/2002 | Kasahara et al. ........... | 360/321 |
| 2002/0003685 | A1 | 1/2002 | Takahashi et al. ........ | 360/327.3 |
| 2002/0006020 | A1 | 1/2002 | Hasegawa ................. | 360/324.2 |
| 2002/0027751 | A1 | 3/2002 | Shimazawa et al. ......... | 360/320 |
| 2002/0030948 | A1 | 3/2002 | Shimazawa ................. | 360/320 |
| 2002/0034055 | A1 | 3/2002 | Seyama et al. ......... | 360/324.11 |
| 2002/0036872 | A1 | * 3/2002 | Hiramoto et al. ........... | 360/321 |
| 2002/0036876 | A1 | 3/2002 | Kawawake et al. ....... | 360/324.1 |
| 2002/0039264 | A1 | * 4/2002 | Ohsawa et al. ............. | 360/322 |
| 2002/0044391 | A1 | * 4/2002 | Hiramoto et al. ........... | 360/321 |
| 2002/0044396 | A1 | 4/2002 | Amano et al. ........... | 360/324.2 |
| 2002/1144393 | | 4/2002 | Seigler et al. .............. | 360/324 |
| 2002/0055016 | A1 | 5/2002 | Hiramoto et al. ........... | 428/692 |
| 2003/0193761 | A1 | * 10/2003 | Cornwell et al. ...... | 360/324.12 |

* cited by examiner

Primary Examiner—Jefferson Evans
(74) Attorney, Agent, or Firm—Kinney & Lange, P.A.

(57) ABSTRACT

A transducing head according to the present invention includes a pair of electrodes, a pair of biasing elements and a magnetoresistive sensor. The magnetoresistive sensor is positioned between the pair of electrodes. The magnetoresistive sensor includes a pair of flux guides and a free layer positioned substantially co-planar with and between the pair of flux guides. The pair of electrodes are for providing a sense current to the free layer in a direction substantially perpendicular to a plane of the free layer. The pair of biasing elements are positioned on opposing sides of the magnetoresistive sensor for providing longitudinal bias to the free layer.

27 Claims, 6 Drawing Sheets

SIDE FLUX GUIDE FOR CURRENT PERPENDICULAR TO PLANE MAGNETORESISTIVE TRANSDUCER

CROSS-REFERENCE TO RELATED APPLICATION(S)

This application claims priority from provisional U.S. Patent application Ser. No. 60/385,661 filed Jun. 3, 2002 for "NOVEL SIDE FLUX GUIDE FOR CPP READER" of Song S. Xue, Paul E. Anderson, and Patrick J. Ryan, which application is hereby incorporated by reference in its entirety.

BACKGROUND OF THE INVENTION

The present invention relates generally to the field of magnetic data storage and retrieval systems. In particular, the present invention relates to a magnetic read head for use in a magnetic data retrieval system that has a magnetoresistive read sensor with side flux guides for providing longitudinal biasing to a sensing layer of the magnetoresistive read sensor.

A current-perpendicular-to-plane (CPP) magnetic read head is positioned over a magnetic disc or medium that is rotated at a high speed. The head is supported over a surface of the magnetic disc by a thin cushion of air produced by the high rotation speed. This surface is called an air bearing surface (ABS). The magnetic read head retrieves magnetically-encoded information that is stored on the disc. Several layers typically form the magnetic read head, including a top electrode, a bottom electrode, and a magnetoresistive (MR) read sensor positioned between the top and bottom electrodes. The electrodes may also function as shields to ensure that the read sensor reads only that information which is stored directly beneath it on the magnetic disc.

A time-dependent magnetic field from the disc causes modulation of a magnetization of the read sensor by rotating the sensor's magnetization direction. Changes in the resistance of the read sensor can be detected by passing a sense current through the read sensor and measuring a voltage across the read sensor. A resulting signal is read by external circuitry to recover encoded information from the disc.

Biasing elements, or permanent magnets, made of a hard magnetic material are used to bias a sensing layer of the read sensor. The biasing elements are commonly arranged according to what is known in the industry as a standard abutted junction (ABJ), with the biasing elements arranged on opposing sides of the MR sensor, and with a pair of lateral isolation layers separating the respective biasing elements from the MR sensor. The MR sensor, isolation layers, and biasing elements are disposed collectively between the pair of electrodes.

The MR read sensor can be of any one of a number of giant magnetoresistive (GMR) read sensor types, including, but not limited to, a tunneling-giant magnetoresistive (TGMR) element, a spin valve (SV) element or a hybrid element. Both TGMR and SV elements have a ferromagnetic free layer and a ferromagnetic pinned layer. The free layer has a magnetic orientation capable of rotation, while the pinned layer has a magnetic orientation fixed in a predetermined direction, generally normal to the ABS. As is known in the art, the pinned layer generally has its magnetic orientation fixed by an exchange coupling with an antiferromagnetic layer placed upon the pinned layer. SV elements differ from TGMR elements in that a SV element has a conductive spacer layer located between the pinned layer and the free layer, while a TGMR element has an insulating or semiconducting barrier layer located between the pinned layer and the free layer. A hybrid GMR sensor may include a multilayer positioned between the free layer and pinned layer formed of a conductive spacer layer similar to the SV element and an insulating or semiconducting barrier layer similar to the TGMR element. Much of the general functioning of TGMR, SV, and hybrid GMR elements is similar. The magnetic orientation of the free layer is influenced by longitudinal biasing from the biasing elements, such that an easy axis of the free layer is generally set normal to the magnetization direction of the pinned layer. The longitudinal biasing of the free layer promotes both a substantially single-domain state and a reduction in noise in the free layer. The lateral isolation layers are used to adjust the magnitude of the longitudinal biasing applied to the free layer. This lateral isolation layer may be of a material having a high electrical resistivity, which also serves to reduce a diversion of some of the sense current into the biasing elements (known as shunting).

As magnetic storage and retrieval systems have developed greater capacities, greater areal bit densities have been employed. Smaller areal bit sizes have corresponded to the greater areal bit densities. Narrow reader widths are desired for retrieval of data stored on ultra-high density media having small areal size bits. More specifically, reader widths less than 0.1 $\mu$m are desirable. These narrow reader widths seek to avoid off-track reading, where the read sensor simultaneously reads a plurality of adjacent bits which can thereby hinder data recovery. Previous configurations of CPP read heads, however, have not been able to provide proper longitudinal biasing as smaller CPP read heads are employed. As sensor widths have decreased, longitudinal biasing fields are sometimes too strong for the narrow MR sensors. Also, use of shape anisotropy, wherein a shape of a film tends to promote the formation of an easy axis in the film, becomes unavailing for establishing an easy axis in the free layer when reader widths are small.

Previous ABJ designs for reader widths less than 0.1 $\mu$m have problems with a sensitivity loss due to a dead region at the junction region, a lack of shape anisotropy, a difficulty in consistently deploying lateral isolation layers, and a difficulty applying a proper magnitude of longitudinal biasing. As the size of the MR sensor decreases to keep up with greater areal densities of magnetic recording media, deviations in thicknesses of the lateral isolation layers make proper longitudinal biasing of small MR sensors problematic, where too much or too little flux can act upon the free layer of the MR sensor. Insufficient biasing can reduce the sensitivity of the MR sensor by failing to provide a substantially single-domain magnetic state along a width of the free layer of the MR sensor. Additionally, too much flux, or magnetic bias, provided by the longitudinal biasing elements may produce dead regions in the free layer where the magnetic orientation is unduly inhibited, effectively pinning the free layer. Extra flux may also produce multiple magnetic domains in the free layer. Dead regions and multiple magnetic domains in the free layer reduce the sensitivity of the MR sensor, hindering the retrieval of data from ultra-high density media. The sensor must also be stabilized against the formation of edge domains because domain wall motion results in electrical noise that makes data recovery impossible.

It has been important to maintain constant MR sensor output by increasing MR sensor sensitivity. In prior art designs, this goal has been accomplished by several methods, including decreasing a thickness of a sensing layer of the MR sensor and/or reducing a thickness of the permanent magnet bias elements and/or recessing the permanent magnet bias elements a distance from the MR sensor. However, previous configurations of MR sensors could provide too much or too little longitudinal bias to MR sensors having small reader widths used in conjunction with ultra-high density recording media, such as variations in the magnitude of longitudinal bias due to deviations in the thicknesses of the lateral isolation layers. This may produce asymmetrical biasing of a degree significant for small read sensor widths. When read sensor widths are less than about 0.1 $\mu$m, previous designs present great difficulties in deploying longitudinal biasing while maintaining the narrow read sensor width. Process control issues arise as dimensions of CPP read sensor become small.

Longitudinal biasing can also be provided by biasing elements composed of a material having a high resistivity, such as oxide hard magnetic materials. A CPP reader having oxide biasing elements in a standard ABJ configuration can provide longitudinal biasing with little shunting of the sense current to the biasing elements. However, deploying the longitudinal biasing with such a design becomes problematic when the MR read sensor width becomes small and the proximity of the biasing elements produces undesirable extra flux.

The embodiments previously known in the art for providing longitudinal biasing have not addressed the problems encountered with MR read sensor widths below 0.1 $\mu$m. Utilization of shape anisotropy to promote an easy axis in the free layer becomes problematic for MR reader widths below 0.1 $\mu$m as a width of the free layer decreases with respect to a height of the free layer. Prior MR read sensor designs utilizing shape anisotropy had an easy axis of the free layer influenced by a free layer height to free layer width aspect ratio that relatively favored the reader width. As reader widths have shrunk in conjunction with smaller areal densities of media, the reader height to reader width aspect ratio no longer lends itself to establishing an easy axis in the free layer. Thus, longitudinal biasing is increasingly important, but reader widths below 0.1 $\mu$m also present difficulties in deploying a proper magnitude of longitudinal biasing due to the dimensions of the read sensor upon which the biasing elements operate.

A novel design is needed to provide proper biasing to sensors for ultra-high density recording where sensor width is below 0.1 $\mu$m while maintaining sensitivity in the sensor.

BRIEF SUMMARY OF THE INVENTION

A transducing head according to the present invention includes a pair of electrodes, a pair of biasing elements and a magnetoresistive sensor. The magnetoresistive sensor is positioned between the pair of electrodes. The magnetoresistive sensor includes a pair of flux guides and a free layer positioned substantially co-planar with and between the pair of flux guides. The pair of electrodes are for providing a sense current to the free layer in a direction substantially perpendicular to a plane of the free layer. The pair of biasing elements are positioned on opposing sides of the magnetoresistive sensor for providing longitudinal bias to the free layer.

DETAILED DESCRIPTION

Figure 1:
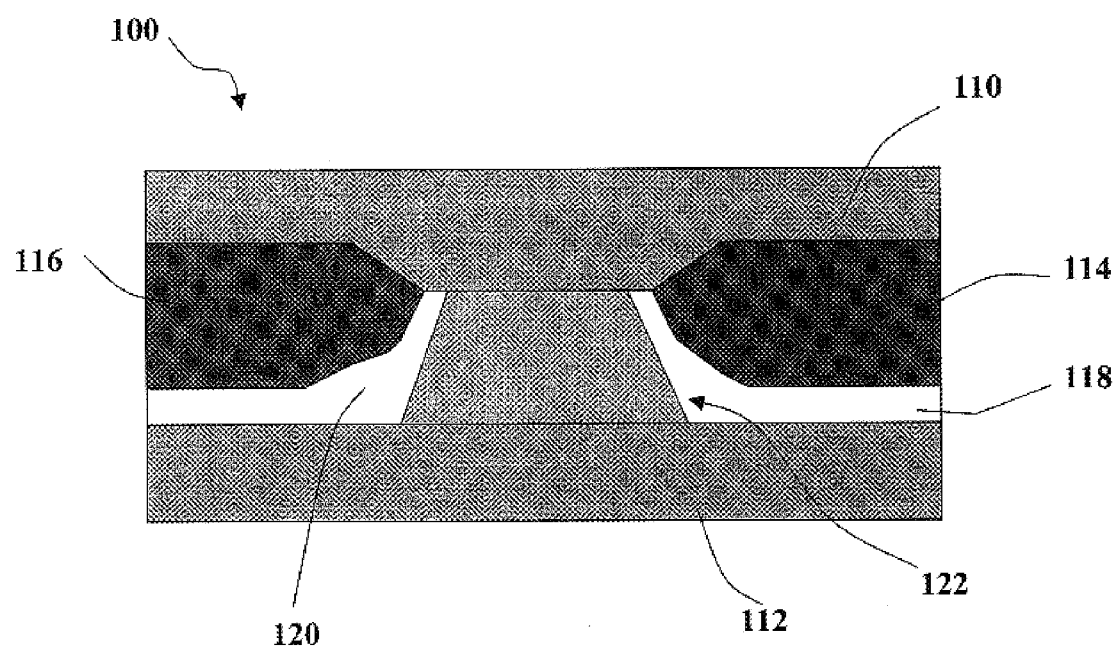
FIG. 1 is a cross-sectional view of a prior art CPP read sensor taken substantially parallel to an air-bearing surface.

FIG. 1 is a cross-sectional view of prior art CPP read head 100. A top electrode 110 and a bottom electrode 112 are provided. A pair of biasing elements, or permanent magnets, 114 and 116, a pair of lateral isolation layers 118 and 120 and a MR element 122 are located between the top electrode 110 and bottom electrode 112. The biasing elements 114 and 116 are arranged on opposing sides of the MR element 122 with the lateral isolation layers 118 and 120 also positioned on opposing sides of the MR element 122 between respective biasing elements 114 and 116 and the MR element 122.

The top electrode 110 and bottom electrode 112 are for providing a sense current which can flow through the MR element 122 in a direction substantially perpendicular to planes of layers (not shown) of the MR element 122. The pair of electrodes 110 and 112 are preferably composed of a conductive material, such as copper, gold, or silver. Each electrode 110 and 112 is commonly formed with a thickness in a range of about 0 Angstroms to about 1000 Angstroms, generally about 100 Angstroms.

Persons skilled in the art will recognize that the MR element 122 can be a TGMR, a SV element or a hybrid-type element. The MR element 122 comprises multiple layers (not shown) including a free layer, a pinned layer, and a spacer layer (for SV type elements), a barrier layer (for TGMR type elements) or a multilayer formed of a spacer layer and a barrier layer (for hybrid-type elements), in such a configuration as is known to the art. The magnetic orientation of the free layer is influenced by longitudinal biasing from the biasing elements, such that an easy axis of the free layer is generally set normal to the magnetization direction of the pinned layer. With SV, TGMR, and hybrid-type elements, relative orientations of the free layer magnetic field and the pinned layer magnetic orientation affects a resistivity of the MR element 122. This change in resistivity of the MR element 122 is indicative of the data stored on the magnetic media, and can be detected by providing a sense current to the MR element 122 by the pair of electrodes 110 and 112 in a CPP direction.

The biasing elements 114 and 116 are preferably composed of a metallic hard magnetic material possessing a high degree of coercivity. These biasing elements 114 and 116 can provide magnetic fields that work to longitudinally bias the magnetization orientation of the free layer portion of the MR sensor 122. Longitudinal biasing contributes to the formation of an easy axis in the free layer of the MR sensor 122. The longitudinal biasing of the free layer promotes a substantially single magnetic domain and reduces noise therein.

The lateral isolation layers 118 and 120 are used to adjust the magnitude of the longitudinal biasing applied to the free layer, when the thickness of the lateral isolation layers is precisely defined and uniform. These lateral isolation layers 118 and 120 are composed of a material having a high electrical resistivity, which can also serve to reduce shunting. Shunting decreases efficiency of the MR sensor 122 because less sense current can successfully pass through the MR sensor 122, which can result in decreased read response to magnetic fields from the media.

The lateral isolation layers 118 and 120 are preferably composed of an insulating material. Because metallic biasing elements 114 and 116 are conductive, the lateral isolation layers 118 and 120 are disposed between the MR sensor 122 and the respective biasing elements 114 and 116. The lateral isolation layers 118 and 120 function to prevent shunting of the sense current to the conductive biasing elements 114 and 116. A thickness of the lateral isolation layers maybe adjusted, subject to some limits as a width of the MR sensor becomes small, so that a desired magnitude of biasing force from the biasing elements 114 and 116 acts upon the free layer of the MR sensor 122.

Figure 2:
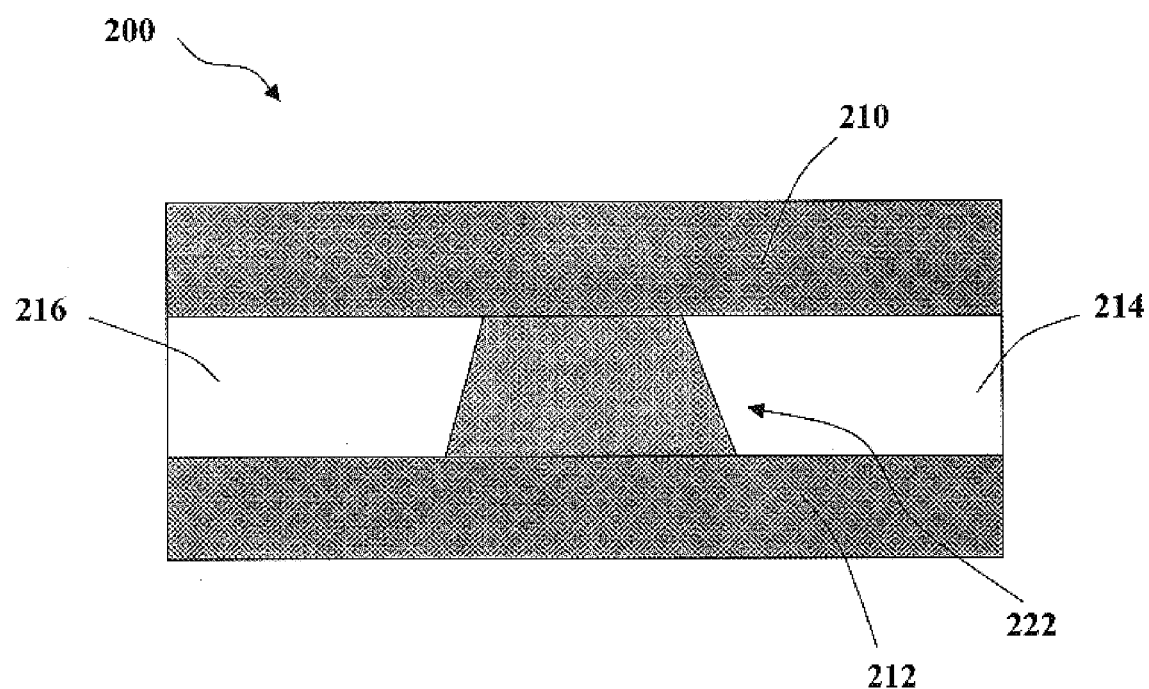
FIG. 2 is a cross-sectional view of a prior art CPP read sensor taken substantially parallel to an air-bearing surface.

FIG. 2 is a cross-sectional view of prior art CPP read sensor 200. For ease of identification, elements here similar to those in FIG. 1 are like-numbered in the last two digits, for example CPP read sensor 100 and CPP read sensor 200. In CPP reader 200, a top electrode 210 and a bottom electrode 212 are provided. A pair of high resistivity hard magnetic biasing elements 214 and 216 are positioned between the top electrode 210 and the bottom electrode 212, with a MR element 222 positioned between the pair of high resistivity biasing elements 214 and 216 and between the top electrode 210 and bottom electrode 212. Persons skilled in the art will recognize that the MR element 222 can be of different types, such as a TGMR, SV, or hybrid-type element.

The function of CPP read head 200 is similar to that described above for CPP read head 100, except that lateral isolation layers are not required. The biasing elements 214 and 216 are composed of a high resistivity hard magnetic material, including but not limited to $CoCrPt+SiO_2$, Co Ferrite, or $Co-\alpha Fe_2O_3$. Thus, the biasing elements 214 and 216 possess high coercivity while also having insulative properties such that shunting of a sense current by the biasing elements 214 and 216 is minimized.

Figure 3:
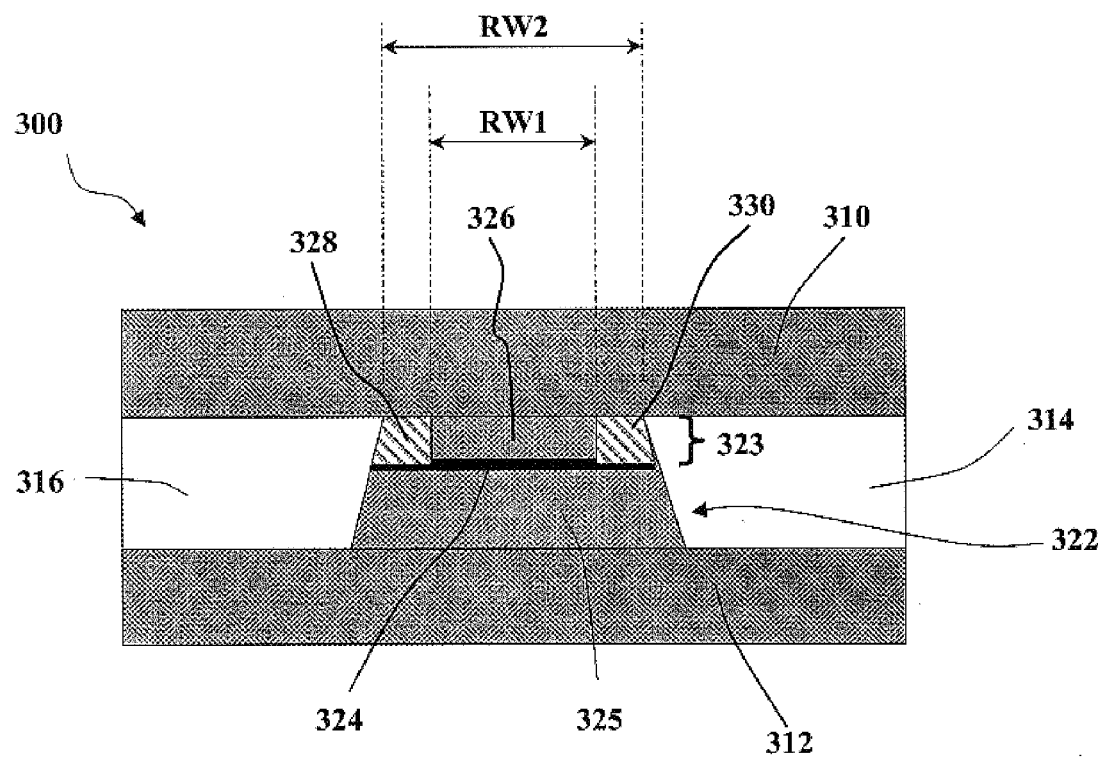
FIG. 3 is a cross-sectional view of a CPP read sensor in accord with a first embodiment of the present invention taken substantially parallel to an air-bearing surface.

FIG. 3 is a cross-sectional view of CPP read head 300 in accord with a first embodiment of the present invention. The CPP read head 300 has a top electrode 310 and a bottom electrode 312. Located between the pair of electrodes 310 and 312 are a pair of biasing elements 314 and 316, with an MR element 322 positioned substantially co-planar with and between the biasing elements 314 and 316. Collectively, the pair of biasing elements 314 and 316 and the MR element 322 are disposed between the pair of electrodes 310 and 312.

The top electrode 310 and bottom electrode 312 are for providing a sense current which can flow through the MR element 323 in a direction perpendicular to planes of layers of the MR element 323. As is generally known in the industry, the sense current is passed through the MR sensor 322 to detect changes in the resistivity of the MR sensor 322. The pair of electrodes 310 and 312 preferably are composed of a conductive material, such as copper, gold, or silver. Each electrode 310 and 312 is commonly formed with a thickness in a range of about 0 Angstroms to about 1000 Angstroms, preferably about 100 Angstroms.

The MR element 322 of this embodiment is a TGMR type element having a sensing layer 323, a barrier layer 324, and a pinned layer 325. The sensing layer 323 is formed of a free layer 326 and a pair of side flux guides 328 and 330. The free layer 326 is located coplanar with and between the pair of side flux guides 328 and 330. The free layer 326 preferably is formed of a ferromagnetic material and is capable of having its magnetic orientation rotated in response to magnetic fields emanating from a magnetic media (not shown). A width of the free layer portion 326 preferably is sufficiently small for compatibility with narrow track widths of ultra-high density recording medium. A sufficiently small width of the free layer 326 is less than about 0.1 µm, as further discussed below. The pinned layer 325 preferably is also formed of a ferromagnetic layer. A magnetization of the pinned layer 325 is fixed by well known methods. The barrier layer 324 is positioned between the sensing layer 323 and the pinned layer 325, and is composed of an insulating material such as carbide, nitride, or oxide, or of a semiconducting material. The particular arrangement of layers in the MR sensor 322 is variable according to configurations known in the art. There can be other arrangements of the layers of the MR sensor 322 differing from that depicted in FIG. 3 that still embody the present invention. For example, configurations such as those using multiple free layers and/or multiple pinned layers and/or multi-layer free layers and/or multi-layer pinned layers and/or multiple MR sensors (such as with a dual SV configuration) may be provided. Further, additional layers, such as antiferromagnetic layers for fixing the magnetization of the pinned layer also may be provided.

The pair of biasing elements 314 and 316 provide longitudinal biasing to the free layer portion 326 of the sensing layer 323. The biasing elements 314 and 316 preferably are composed of a high resistivity hard magnetic material including but not limited to $CoCrPt+SiO_2$, Co Ferrite, or $Co-\alpha Fe_2O_3$. The biasing elements 314 and 316 possess high coercivity and also high resistivity like a dielectric film. The longitudinal bias force is used to promote a substantially single magnetic domain in the free layer portion 326 of the sensing layer 323, and also to suppress noise.

The side flux guides 328 and 330 preferably are composed of a soft magnetic material such as NiFeRe, NiFeCr, NiFeRh, CoZrNb, or CrZrTa. The side flux guides 328 and 330 pick up near zero signals from a recording media (not shown) while still conducting magnetic flux from the biasing elements 314 and 316 to the free layer 326. Thus, the side flux guides 328 and 330 provide additional magnetic width for longitudinal biasing of the sensing layer 323, while allowing a narrow reader width of the free layer 326. The magnetic fields produced by the biasing elements 314 and 316 thus stabilize the magnetic domain of the free layer 326, promoting a substantially single magnetic domain therein. The additional magnetic width provided by the side flux guides 328 and 330 allows proper stabilization of the free layer 326 when the width of the free layer 326 is small. A width of the flux guides 328 and 330 may be adjusted so that both the sensitivity and stability of the free layer 326 can be maintained.

As seen in FIG. 3, a physical reader width RW1 is defined by a width of the free layer 326 (or the distance between the side flux guides 328 and 330). A magnetic reader width RW2 is defined as a distance between the biasing elements 314 and 316 measured from points on opposing faces of the biasing elements 314 and 316. The present invention has physical reader width RW1 less than about 0.15 µm (RW1<0.15 µm), and magnetic reader width RW2 less than about 0.5 µm (RW2<0.3 µm). Replacement of end portions of the sensing layer 323 with side flux guides 328 and 330 allows sufficient magnetic reader width RW2 for the biasing elements 314 and 316 to properly stabilize the sensing layer 323, while the physical reader width RW1 is sufficiently small for use with ultra-high density media. The present invention also has an electrical reader width very close in dimension to the physical reader width RW1.

Physical reader width RW1 and magnetic reader width RW2 may be set according to the amount of flux that need be applied to the free layer 326 to maintain sufficient longitudinal bias. The flux guides 328 and 330 thereby provide additional magnetic width upon which the biasing elements 314 and 316 act, while the read-sensitive width seen in physical reader width RW1 can still remain small. This embodiment avoids problems with dead regions or multiple domains in the free layer 326 reducing efficiency of the sensing layer 323 yet still provides adequate bias to reduce noise and promote a substantially single magnetic domain in the free layer 326.

Figure 4:
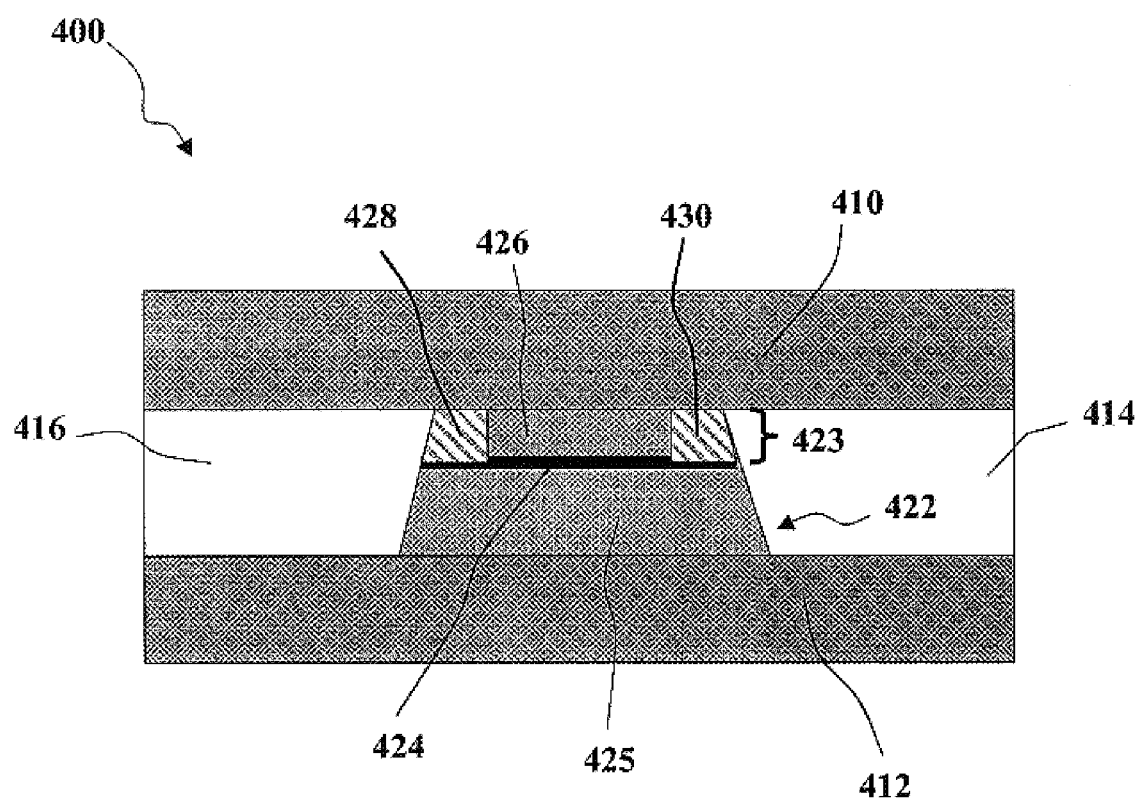
FIG. 4 is a cross-sectional view of a CPP read sensor in accord with a second embodiment of the present invention taken parallel to an air-bearing surface.

FIG. 4 is a cross-sectional view of a CPP read head 400 in accord with a second embodiment of the present invention. For ease of identification, similar elements in FIGS. 3–6 are like numbered in the last two digits, for example, CPP read head 300 in FIG. 3 corresponds to CPP read head 400 in FIG. 4. The CPP read head 400 has a top electrode 410 and a bottom electrode 412. Positioned between electrodes 410 and 412 are a pair of biasing elements 414 and 416 and MR sensor 422 located substantially in-plane with and between the biasing elements 414 and 416. The biasing elements 414 and 416 are composed of a hard magnetic material having a high resistivity.

The CPP read head 400 is constructed and functions similar to the CPP read head 300, though the type of MR sensor used is different in the respective embodiments. In this embodiment, the MR sensor 422 is a SV element. MR sensor 422 includes a sensing layer 423, a spacer layer 424, and a pinned layer 425. The spacer layer 424 may be composed of conductive materials such as copper, gold, or silver. Sensing layer 423 includes free layer 426 positioned between a pair of side flux guides 428 and 430. The side flux guides 428 and 430 are composed of a soft magnetic material, as with the previous embodiment.

Figure 5:
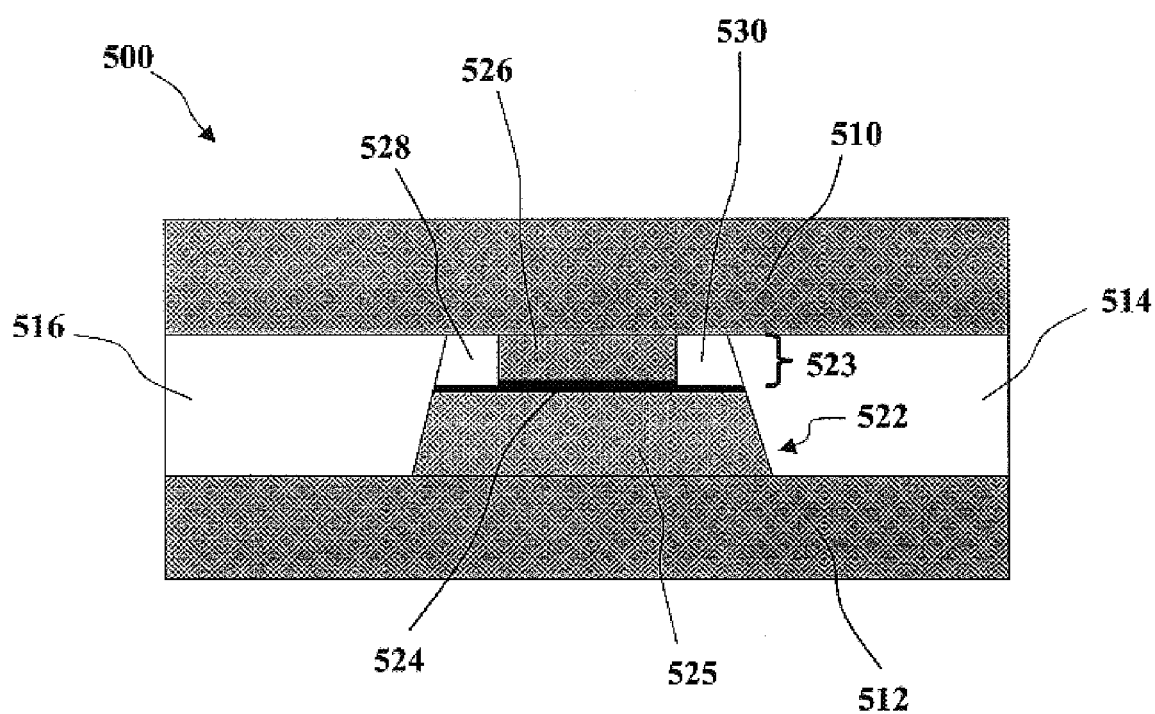
FIG. 5 is a cross-sectional view of a CPP read sensor in accord with a third embodiment of the present invention taken substantially parallel to an air-bearing surface.

FIG. 5 is a cross-sectional view of a CPP read head 500 in accord with a third embodiment of the present invention. Here, the CPP read head 500 has a top electrode 510 and a bottom electrode 512. Located between electrodes 510 and 512 are a pair of biasing elements 514 and 516 with an MR sensor 522 located substantially in-plane with and therebetween. The MR sensor 522 of CPP read head 500 may be a TGMR, SV, or hybrid-type element. The MR sensor has a sensing layer 523, an interior layer 524, and a pinned layer 525. Sensing layer 523 includes a free layer 526 located between a pair of side flux guides 528 and 530. As seen with previous embodiments, the interior layer 524 may be a barrier layer if MR sensor 522 is a TGMR element, a spacer layer if MR sensor 522 is a SV element, or a multilayer having a barrier layer and a spacer layer if MR sensor 522 is a hybrid-type element.

The embodiment of the invention present in FIG. 5 has similar construction and functioning as with the previous embodiments. Similar to the first and second embodiments, the flux guides 528 and 530 are composed of a soft magnetic material; however, differently than those embodiments, the material forming the flux guides 528 and 530 also has a high resistivity to minimize an amount of a sense current shunted by the side flux guides 528 and 530. Thus, the flux guides 528 and 530 are preferably formed of a high resistivity, soft magnetic material including but not limited to CoFeHfO, NiFeHfO, $CoMgF_2$, $FeSi_3N_4$, $FeAl_2O_3$. Since the side flux guides 528 and 530 replace portions of the sensing layer 523, an electrically conductive width of the sensing layer 523 is less than a magnetic width of the sensing layer 523 due to the high resistivity of the side flux guides 528 and 530.

Figure 6:
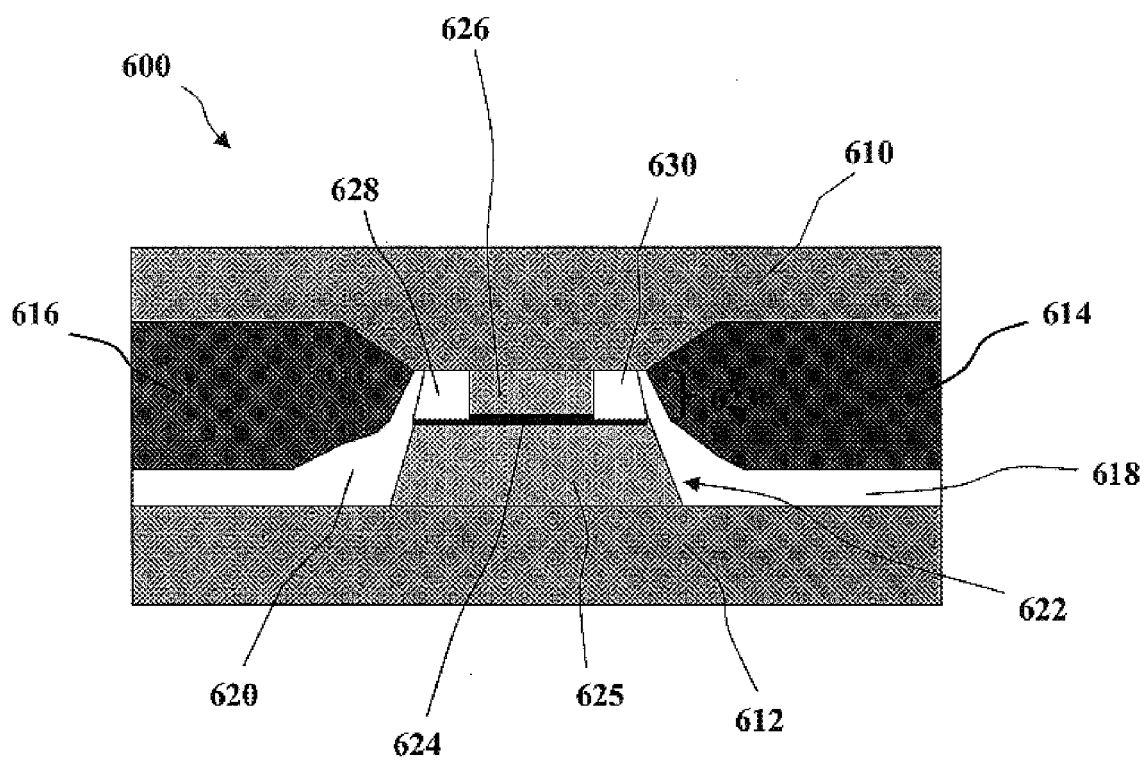
FIG. 6 is a cross-sectional view of a CPP read sensor in accord with a fourth embodiment of the present invention taken substantially parallel to an air-bearing surface.

FIG. 6 is a cross-sectional view of CPP read head 600 in accord with a fourth embodiment of the present invention. CPP read head 600 has a top electrode 610 and a bottom electrode 612. Located between electrodes 610 and 612 are a pair of biasing elements 614 and 616, a pair of lateral isolation layers 618 and 620, and a MR sensor 622. The MR sensor 622 is located substantially co-planar with and between the biasing elements 614 and 616, with the pair of lateral isolation layers 618 and 620 disposed between the biasing elements 614 and 616, respectively, and the MR sensor 622. The MR sensor 622 may be either a TGMR SV, or hybrid-type read element, and includes a sensing layer 632, an interior layer 624, and a pinned layer 626. The interior layer 624 may be a spacer layer if the MR sensor 622 is a SV type element, a barrier layer if the MR sensor 622 is a TGMR type element, or a multilayer having a barrier layer and a spacer layer if the MR sensor 622 is a hybrid-type element. Sensing layer 623 includes free layer 626 positioned coplanar with and between side flux guides 628 and 630.

In this embodiment, the biasing elements 614 and 616 are preferably composed of a metallic hard magnetic material and the lateral isolation layers 618 and 620 are preferably composed of a material having a high resistivity, such as a dielectric film. The side flux guides 628 and 630 are composed of a soft magnetic material having a high resistivity, such as a CoFeHfO or NiFeHfO dielectric film. The side flux guides 628 and 630 thus provide additional magnetic width upon which the flux from the biasing elements 614 and 616 can operate while the side flux guides 628 and 630 also restrict a width of the sensing layer 623 that is conductive of the sense current and responsive to magnetic fields from a media. The construction and functioning of this embodiment is otherwise similar to those other embodiments discussed above.

Thus, the present invention addresses the problem of the prior art in deploying proper longitudinal bias to an MR sensor having a narrow reader width. The CPP read head of the present invention has side flux guides which lengthen a magnetic width of a sensing layer of the MR sensor having a narrow read-sensitive width. The CPP head with side flux guides of the present invention thereby achieves proper longitudinal biasing of the narrow free layer while maintaining sensitivity of the MR sensor.

The CPP read sensor of the present invention has many applications, including but not limited to, use as a hard disc drive read sensor, a magnetic field sensor, and a magnetic field angle sensor. The CPP read head of the present invention may also be used as part of a non-volatile memory unit.

Although the present invention has been described with reference to preferred embodiments, workers skilled in the art will recognize that changes may be made in form and detail without departing from the spirit and scope of the invention.

What is claimed is:

1. A transducing head comprising:
a pair of electrodes;
a magnetoresistive sensor comprising a free layer and a pair of flux guides, the free layer being positioned substantially co-planar with and between the pair of flux guides, the magnetoresistive sensor being positioned between the pair of electrodes, the pair of electrodes for providing a sense current to the free layer in a direction substantially perpendicular to a plane of the free layer; and a pair of biasing elements positioned on opposing sides of the magnetoresistive sensor for providing longitudinal bias to the free layer.

2. The transducing head according to claim 1 wherein the free layer has a width less than about 0.15 µm.

3. The transducing head according to claim 1 wherein the pair of biasing elements are composed of a hard magnetic material having a high electrical resistivity.

4. The transducing head according to claim 1 wherein the biasing elements are formed of oxide hard magnetic film selected from a group consisting of oxides, carbides, and nitrides.

5. The transducing head according to claim 1 wherein the pair of flux guides are composed of a soft magnetic material having a high electrical resistivity.

6. The transducing head according to claim 1 wherein the magnetoresistive sensor is a tunneling giant magnetoresistive sensor.

7. The transducing head according to claim 1 wherein the magnetoresistive sensor is a spin valve sensor.

8. The transducing head according to claim 1 wherein the magnetoresistive sensor is a hybrid-type giant magnetoresistive sensor comprising a free layer, a pinned layer, and a multilayer interior layer positioned between the free layer and the pinned layer.

9. The transducing head according to claim 1 and further comprising a pair of lateral isolation layers positioned between the pair of biasing elements and the magnetoresistive sensor.

10. A current-perpendicular-to-plane reader comprising:

a pair of substantially parallel electrodes for providing a sense current in a direction substantially perpendicular to a plane of the pair of electrodes;

a sensing layer having a free layer and a pair of flux guides, the free layer being positioned substantially co-planar with and between the pair of flux guides, the sensing layer being positioned between the pair of electrodes; and a pair of bias elements positioned on opposing sides of the sensing layer for providing bias thereto.

11. The current-perpendicular-to-plane reader according to claim 10 wherein the free layer has a width less than about 0.15 µm.

12. The current-perpendicular-to-plane reader according to claim 10 wherein the pair of biasing elements are composed of a hard magnetic material having a high electrical resistivity.

13. The current-perpendicular-to-plane reader according to claim 10 wherein the biasing elements are formed of a hard magnetic film selected from a group consisting of oxides, carbides, and nitrides.

14. The current-perpendicular-to-plane reader according to claim 10 wherein the pair of flux guides are composed of a soft magnetic material having a high electrical resistivity.

15. The current-perpendicular-to-plane reader according to claim 10 and further comprising a pinned layer and a barrier layer positioned between the sensing layer and the pinned layer, wherein the pinned layer is positioned between the pair of electrodes.

16. The current-perpendicular-to-plane reader according to claim 10 and further comprising a pinned layer and a spacer layer positioned between the sensing layer and the pinned layer, wherein the pinned layer is positioned between the pair of electrodes.

17. The current-perpendicular-to-plane reader according to claim 10 and further comprising a pinned layer and a multilayer interior layer having a barrier layer and a spacer layer.

18. The current-perpendicular-to-plane reader according to claim 10 and further comprising a pair of lateral isolation layers positioned between the pair of biasing elements and the sensing layer.

19. In a current-perpendicular-to-plane reader comprising:

a magnetoresistive sensor having a sensing layer;

a pair of electrodes facing opposing first and second sides of the magnetoresistive sensor for providing a current to the magnetoresistive sensor in a direction substantially perpendicular to a plane of the sensing layer; and a pair of biasing elements facing opposing third and fourth sides of the magnetoresistive sensor different than the first and second sides, an improvement comprising the sensing layer of the magnetoresistive sensor comprising:

a first flux guide and a second flux guide; and a ferromagnetic layer positioned substantially co-planar with and between the first flux guide and the second flux guide.

20. The current-perpendicular-to-plane reader according to claim 19 wherein the ferromagnetic layer has a width less than about 0.15 µm.

21. The current-perpendicular-to-plane reader according to claim 19 wherein the pair of biasing elements are composed of a hard magnetic material having a high electrical resistivity.

22. The current-perpendicular-to-plane reader according to claim 19 wherein the biasing elements are formed of a hard magnetic film selected from a group consisting of oxides, carbides, and nitrides.

23. The current-perpendicular-to-plane reader according to claim 19 wherein the pair of flux guides are composed of a soft magnetic material having a high electrical resistivity.

24. The current-perpendicular-to-plane reader according to claim 19 wherein the magnetoresistive sensor is a tunneling giant magnetoresistive sensor.

25. The current-perpendicular-to-plane reader according to claim 19 wherein the magnetoresistive sensor is a spin valve sensor.

26. The current-perpendicular-to-plane reader according to claim 19 wherein the magnetoresistive sensor is a hybrid-type sensor.

27. The current-perpendicular-to-plane reader according to claim 19 and further comprising a pair of lateral isolation layers positioned between the pair of biasing elements and the sensing layer.

* * * * *